US008875569B2

(12) United States Patent
Mökander

(10) Patent No.: US 8,875,569 B2
(45) Date of Patent: Nov. 4, 2014

(54) LEVEL SENSOR AND RESERVOIR FOR HOUSING LIQUID

(75) Inventor: Jürgen Mökander, Sollentuna (SE)

(73) Assignee: Xylem IP Holdings LLC, White Plains, NY (US)

( * ) Notice: Subject to any disclaimer, the term of this patent is extended or adjusted under 35 U.S.C. 154(b) by 295 days.

(21) Appl. No.: 13/380,355

(22) PCT Filed: Jun. 9, 2010

(86) PCT No.: PCT/SE2010/050638
§ 371 (c)(1),
(2), (4) Date: Dec. 22, 2011

(87) PCT Pub. No.: WO2011/002392
PCT Pub. Date: Jan. 6, 2011

(65) Prior Publication Data
US 2012/0096939 A1    Apr. 26, 2012

(30) Foreign Application Priority Data

Jul. 3, 2009  (SE) .................................. 0900924-2

(51) Int. Cl.
*G01F 23/00*   (2006.01)
*G01F 23/296*  (2006.01)

(52) U.S. Cl.
CPC .................................. *G01F 23/2961* (2013.01)
USPC ....................................................... 73/290 V

(58) Field of Classification Search
CPC ............ G01F 23/2966; G01F 23/2967; G01F 23/296; G01F 23/2961; G01F 23/2965
USPC ................... 73/290 V, 290 B, 290 R
See application file for complete search history.

(56) References Cited

U.S. PATENT DOCUMENTS

| 2,283,429 | A | * | 5/1942 | Ennis .......................... 73/152.18 |
| 4,213,337 | A |   | 7/1980 | Langdon |
| 4,740,726 | A |   | 4/1988 | Umezawa |
| 5,824,980 | A |   | 10/1998 | Sodergard |
| 8,448,509 | B2 | * | 5/2013 | Elofsson et al. ............ 73/290 V |

FOREIGN PATENT DOCUMENTS

| EP | 0 355 038 A1 | 2/1990 |
| EP | 0 499 265 A2 | 8/1992 |
| EP | 0 949 489 A1 | 10/1999 |
| GB | 1 531 729 | 11/1978 |

OTHER PUBLICATIONS

Norlin, Monica, International Search Report and Written Opinion dated Aug. 26, 2010.

* cited by examiner

*Primary Examiner* — Daniel S Larkin
*Assistant Examiner* — Jamar Ray
(74) *Attorney, Agent, or Firm* — RatnerPrestia

(57) ABSTRACT

A sensor for determining level of liquid in a reservoir, a reservoir containing such sensor, and a method for determining level using such sensor. The sensor comprises a liquid-proof housing, at least one actuator operatively connected to the inner side of the housing and configured to generate vibrations, and at least one vibration sensor operatively connected town inner side of the housing and configured to measure vibrations. The actuator comprises an electromagnet directly or indirectly fixedly connected to the inner side of the housing, and a permanent magnet movably suspended in the housing, wherein the electromagnet and the permanent magnet are configured such that activation of the actuator creates an oscillating mutual displacement in parallel with a longitudinal center axis of the electromagnet.

20 Claims, 5 Drawing Sheets

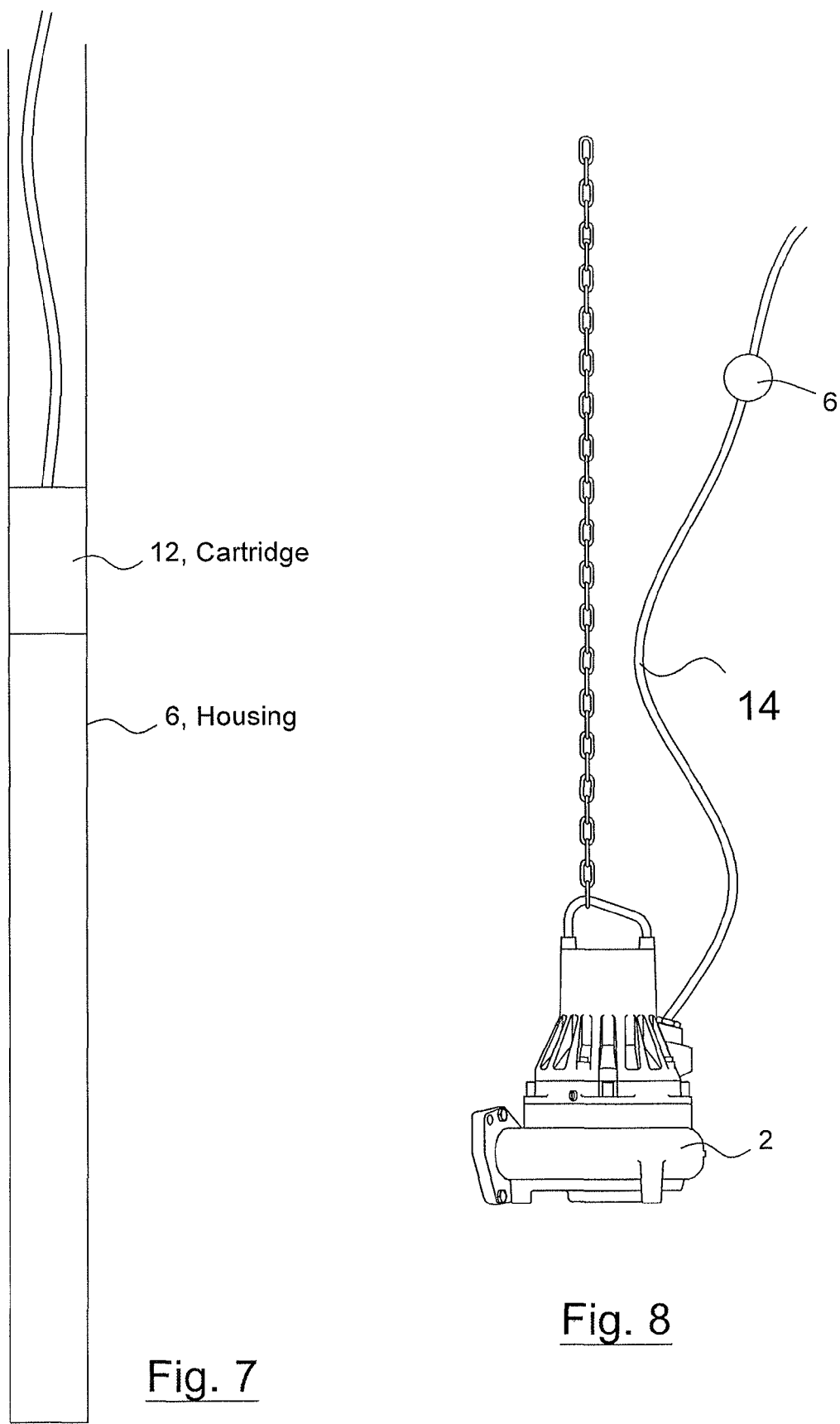

LEVEL SENSOR AND RESERVOIR FOR HOUSING LIQUID

CROSS REFERENCE TO RELATED APPLICATIONS

This application is the national phase filing of international patent application No. PCT/SE2010/050638, filed 9 Jun. 2010, and claims priority of Sweden patent application number 0900924-2, filed 3 Jul. 2009, the entireties of which applications are incorporated herein by reference.

TECHNICAL FIELD OF THE INVENTION

The present invention relates generally to a control equipment component to be used at handling of liquid. Specifically the present invention relates to a level sensor for determining the liquid level in a reservoir, comprising at least one actuator that is arranged to generate vibrations, at least one vibration sensor that is arranged to measure vibrations, as well as a liquidproof housing, the at least one actuator and the at least one vibration sensor being operatively connected to an inner side of the liquidproof housing, an outer side of the liquidproof housing being arranged to be located radially inside an outer envelope surface of the reservoir that is arranged to house liquid. Thereto the present invention relates to a reservoir for housing liquid.

BACKGROUND OF THE INVENTION AND PRIOR ART

At use of a pump in a reservoir, pump stations and such spaces which when necessary require discharge of liquid, such as waste water, penetrating ground water, etc., an as optimal operation of the pump as possible is aimed at, which inter alia imply that a sufficient amount of liquid is allowed to accumulate before the pumping/bilge pumping takes place in order to get the number of start and stop of the pump to a minimum.

Starting and stopping, respectively, of the pump takes place in an conventional way by determining the liquid level in the reservoir by means of a level sensor. These level sensors within the area of waste water treatment are usually so called free hanging mechanical level sensors, which take a small inclination in relation to a plumbline when the level sensor is surrounded by air and takes a large inclination in relation to the plumbline when the level sensor is immersed in the liquid. The orientation of the level sensor change from the first to the second position as the liquid level rise and from the second to the first position as the liquid level sink. At the time of such a change a movable weight enclosed inside the level sensor activates a micro switch whereupon the pump is started and stopped, respectively. One example on such a level sensor is shown in EP 0,568,508 B1.

This type of level sensor comprising movable weights are difficult to construct in order to obtain a reliable operation of the level sensor. Problems that may arise are that the movable weight can get stuck in different positions or that deposits from the liquid attach to the housing of the level sensor whereupon the inclination of the level sensor in relation to the plumbline decreases when it is immersed in the liquid or the inclination of the level sensor is obstructed by other components in the pump station, which result in an erroneous operation of the level sensor.

Thereto there are floating level sensor, which hangs more or less vertical when they are surrounded by air and which floats more or less horizontal when the liquid level is high enough. Due to currents in the liquid such level sensors may float about and get tangled in other level sensors, pipes, ladders, etc., which result in an erroneous operation of the level sensor.

OBJECT AND SUMMARY OF THE INVENTION

The present invention aims at obviating the aforementioned disadvantages and failings of previously known level sensors, and at providing an improved level sensor. A primary object of the present invention is to provide an improved level sensor of the initially defined type, which determine the liquid level in the reservoir without having the orientation and/or movement of the level sensor affecting the determination of the liquid level in the reservoir. It is another object of the present invention to provide a level sensor, the functions of which does not run the risk of getting affected by contaminations present in the liquid, or by other components that are present in the reservoir. It is another object of the present invention to provide a level sensor, the position of which vertically in relation to the reservoir is adjustable.

According to the invention at least the primary object is attained by means of the initially defined level sensor, which is characterized in that said at least one actuator (4) comprises an electro magnet (9), which is direct or indirect fixedly connected to the inner side of the liquidproof housing (6) and which presents a longitudinal centre axis, and a permanent magnet (10), which is movably suspended in said liquidproof housing (6), the electro magnet (9) and the permanent magnet (10) being arranged in such a way that an oscillating mutual displacement in parallel with the longitudinal centre axis takes place upon activation of the actuator (4).

Thus, the present invention is based on the understanding that the liquid level in a reservoir, a buried tank, a mine shaft, etc., the outer side of which is not accessible, can be determined by means of a level sensor that does not use its orientation and/or movement in relation to the reservoir in order to determine the liquid level.

Preferred embodiments of the present invention are further defined in the dependent claims.

Preferably at least a part of the outer side of the liquidproof housing is arranged to face the volume that is delimited by the reservoir. A direct contact between the liquid/air in the reservoir and the liquidproof housing of the level sensor provide an accurate determination of the liquid level, as no consideration must be taken for the problems of vibration transfer between the liquidproof housing of the level sensor and the otherwise necessary liquid contacting construction component, or the material in said construction component.

According to a preferred embodiment said liquidproof housing is constituted by a body, which is connected to an electric cable in a liquidproof fashion. This entails that the level sensor may be hung in the reservoir by means of said electric cable, whereupon the position of the level sensor vertically in relation to reservoir is adjustable. The position of the level sensor vertically is often determined in connection with the installation and tuning of the reservoir, why fixed level sensors at the outside of the reservoir are not suitable.

In yet another preferred embodiment said liquidproof housing is constituted by an elongated pipe, the at least one actuator and the at least one vibration sensor being arranged in a cartridge, which is axially displaceable in said elongated pipe and which is disengageably fastenable in said elongated pipe. This entails that the pipe may be designed as a fixed installation in the reservoir and that the cartridge of the level sensor itself does not need to be liquidproof or explosion resistant, etc. This embodiment also entail that the position of the level sensor vertically in relation to the reservoir is adjustable.

In yet another preferred embodiment said liquidproof housing is constituted by a pump housing. This provide a very robust liquid level determination that is suitable for instance for a bilge pump that is used in mines or the like, where the liquid level rarely or never is allowed to become higher than the construction height of the pump.

The object of the invention is also attained by means of the initially defined reservoir, which is characterized in that it comprises at least one inventive level sensor.

Further advantages and features of the invention will be apparent from the other dependent claims as well as from the following detailed description of preferred embodiments.

BRIEF DESCRIPTION OF THE DRAWINGS

A more complete understanding of the abovementioned and other features and advantages of the present invention will be apparent from the following detailed description of preferred embodiments in conjunction with the appended drawings, wherein:

FIG. 7 is a schematic partly cut side view of a level sensor according to a forth embodiment, FIG. 8 is a schematic side view of a level sensor according to a fifth embodiment.

DETAILED DESCRIPTION OF PREFERRED EMBODIMENTS

Figure 1:
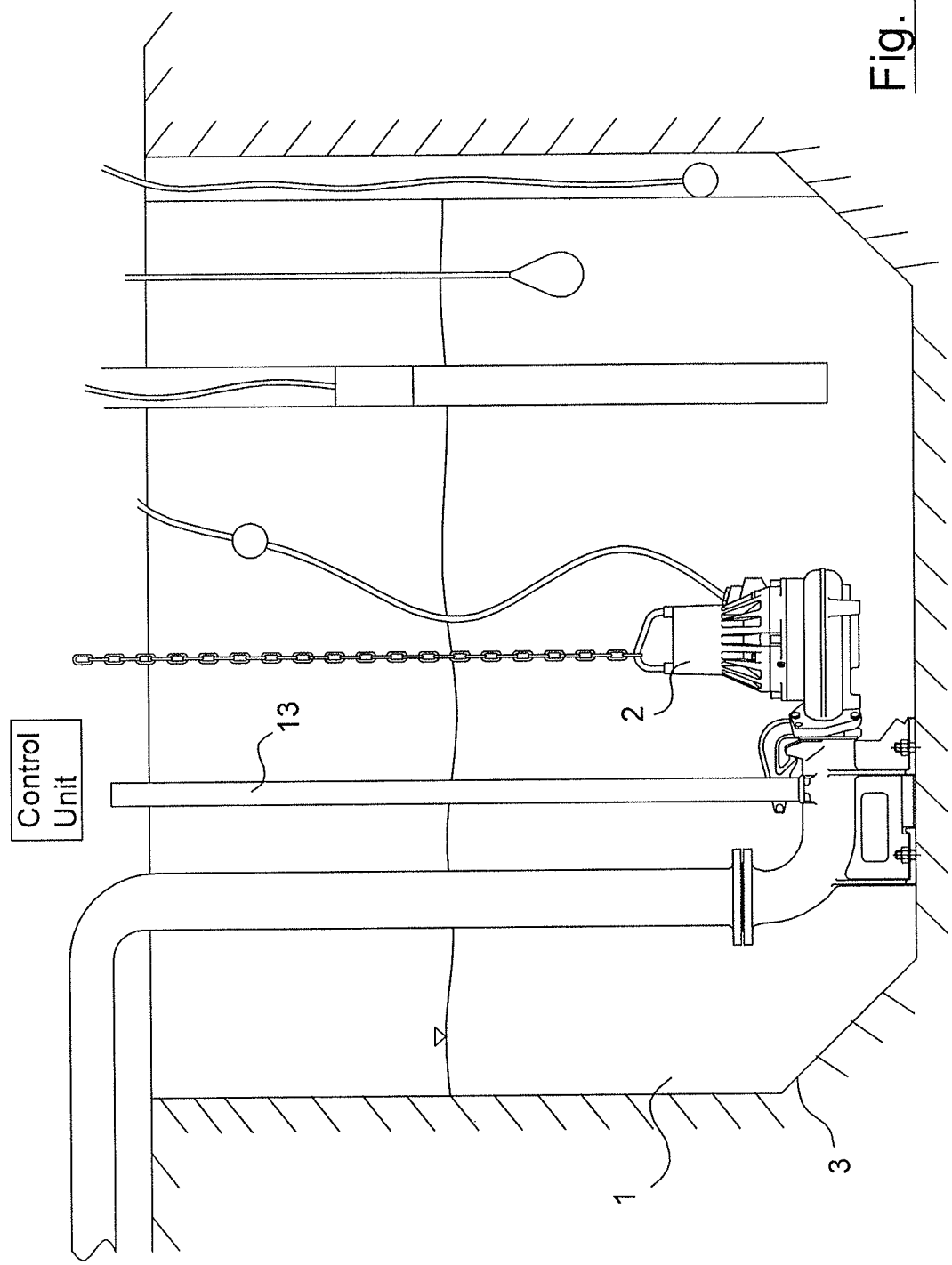
FIG. 1 is a schematic side view of a pump station comprising level sensors according to different embodiments.

Reference is initially made to FIG. 1, in which a reservoir 1 is shown, for instance a pump station, a tank, a mine shaft, a cavity, or the like. This invention is especially suitable for reservoirs 1 the outer side of which are not accessible, for instance due to the fact that the reservoir 1 is buried into the ground or that the mine shaft does not have a clear outer side.

The invention involve determination of the liquid level in a reservoir 1, and it shall be pointed out that the invention is not restricted to any specific use of the determined liquid level. However, the use of the invention will be described together with a pump station application comprising at least one pump, which for instance may be immersed in the reservoir or be dry installed, etc. Thus, the present invention is usable in all possible applications where there is a need to determine the liquid level in the reservoir.

The reservoir 1 according to FIG. 1 comprises, in exemplifying purpose, several level sensors according to different embodiments, which level sensors are arranged to determine the liquid level in said reservoir 1. The determination of the liquid level is preferably used to control the starting and stopping, respectively, of at least one pump 2 in a conventional way, which pump 2 in the shown embodiment is of submergible type. The reservoir 1 comprises, in the shown embodiment, a wall 3 delimiting a volume, in which liquid such as waste water is buffered for further conveyance by means of the pump 2.

It shall be pointed out that the following description holds for all types of inventive level sensors operating according to the inventive acoustic principle, however, reference will be made to FIGS. 2 to 4, if nothing else is indicated.

The inventive level sensor comprises at least one actuator 4 that is arranged to generate vibrations, at least one vibration sensor 5 that is arranged to measure vibrations, as well as a liquidproof housing 6. The at least one actuator 4 is operatively connected to an inner side 7 of said liquidproof housing 6, either direct or indirect, in order to generate vibrations in the liquidproof housing 6. According to the embodiment shown in FIG. 4 the actuator 4 may be connected to the inner side 7 of the liquidproof housing 6 via a rigid plate 8, however, it is preferred that the actuator 4 is directly connected to the inner side 7 of the liquidproof housing 6, as is shown in the FIGS. 2 and 3. By operatively connected is meant that imperative, direct or indirect, abutment between the actuator 4 and the inner side 7 of the liquidproof housing 6 exists. This can for instance be effected by means of biasing using spring force or by means of using an adhesive.

Preferably the actuator 4 comprises an electro magnet 9, which is direct or indirect fixedly connected to the inner side 7 of the liquidproof housing 6 and which presents a longitudinal centre axis, and a permanent magnet 10, which is movably suspended inside said liquidproof housing 6, the reverse relationship may also apply. The electro magnet 9 and the permanent magnet 10 are arranged in such a way that an oscillating relative displacement of them in parallel with said longitudinal centre axis takes place upon activation of the actuator 4, like a loud speaker member, whereupon vibrations will result in the liquidproof housing 6. Even though the electro magnet 9 of the actuator 4 preferably is arranged perpendicular to the inner side 7 of the liquidproof housing 6 this is not necessary, but the electro magnet 9 may be arranged in any other angle to the inner side 7. It shall be pointed out that also other vibration generating components may be used as an actuator 4, such as piezoelectric crystal. The actuator 4 shall preferably generate vibrations having a frequency exceeding 100 Hz.

The at least one vibration sensor 5 is also operatively connected to the inner side 7 of the liquidproof housing 6, either direct or indirect, for measuring the vibrations in the liquidproof housing 6. According to the embodiment shown in FIG. 3 the vibration sensor 5 may be connected to the electro magnet 9 of the actuator 4, which is the preferred embodiment. However, the vibration sensor 5 may as is shown in FIG. 4 be connected to the rigid plate 8 or as is shown in FIG. 2 be connected directly to the inner side 7 of the liquidproof housing 6. The vibration sensor 5 comprises preferably an accelerometer for measuring the vibrations in the liquidproof housing 6. By operatively connected is meant that imperative, direct or indirect, abutment between the vibration sensor 5 and the inner side 7 of the liquidproof housing 6 exists. This can for instance be effected by means of biasing using spring force or by means of using an adhesive.

According to the invention an outer side of said liquidproof housing 6 is arranged to be located radially inside an outer envelope surface of the outer wall 3 of the reservoir 1, in order to admit access also when the reservoir 1 for instance is buried into the ground. In the case including a mine shaft or the like, the outer envelope surface of the outer wall 3 of the mine shaft is considered coinciding with the inner side of the outer wall 3. Preferably at least a part of the outer side of the liquidproof housing 6 face the volume delimited by the reservoir 1. Direct contact between air/liquid in the reservoir 1 and the outer side of the liquidproof housing 6 provide an unambiguous determination of the liquid level in the reservoir 1.

The at least one actuator 4 and the at least one vibration sensor 5 are thereto operatively connected to a control unit (see FIG. 1), which is arranged to provide an activation signal to the at least one actuator 4 and receive a measuring signal from the at least one vibration sensor 5. When the level sensor is surrounded by air there is a small difference between the activation signal and the measuring signal, and when the level sensor is immersed in liquid there is a great difference between the activation signal and the measuring signal, due to the inertia forced to the liquidproof housing 6 by the liquid. Thus, when the liquid level rise in the reservoir 1 and reach or pass an level sensor the control unit register that the difference between the activation signal and the measuring signal increases and for instance start the pump 2, and when the liquid level sink in the reservoir 1 and reach or pass a level sensor the control unit register that the difference between the activation signal and the measuring signal decreases and for instance stop the pump 2. Alternatively only an upper level sensor may be used to start the pump 2, and thereto the pump 2 is stopped when it in a suitable way is detected that the liquid level is so low that it partly sucks air, also known as the pump 2 is snoring.

Herein below specific embodiments of the inventive level sensor will be described, more precisely embodiments showing how the liquidproof housing 6 may be realized.

Figure 3:
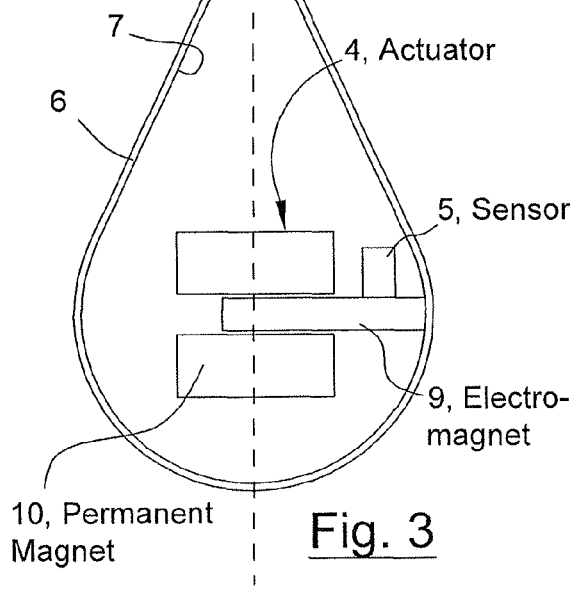
FIG. 2-4 are schematic side views of a level sensor according to a first embodiment.
Figure 2:
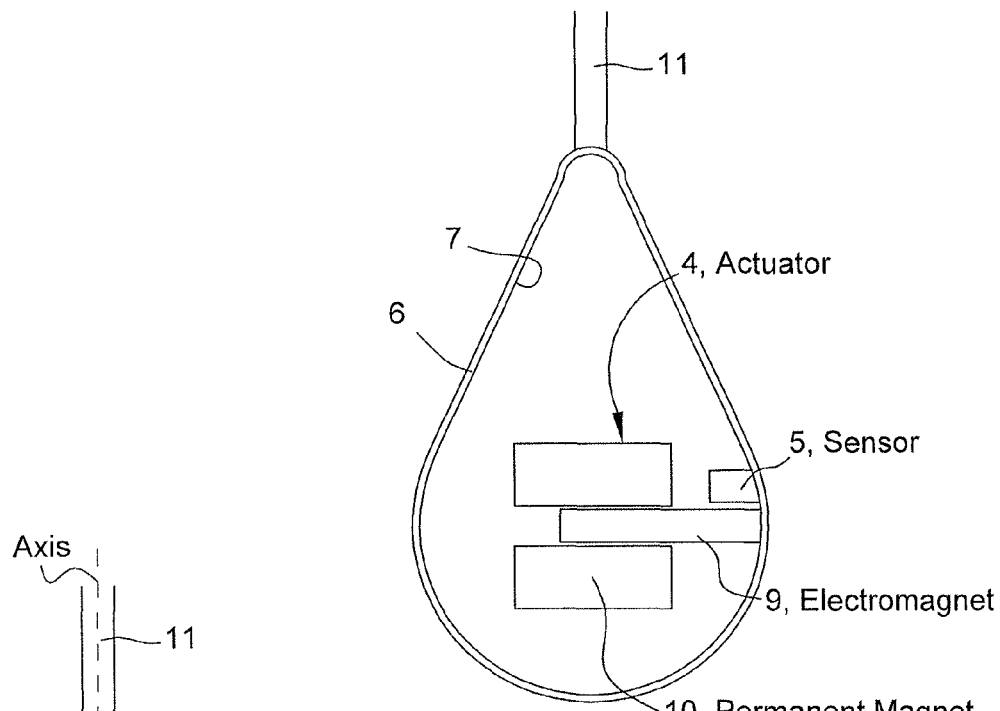
Figure 4:
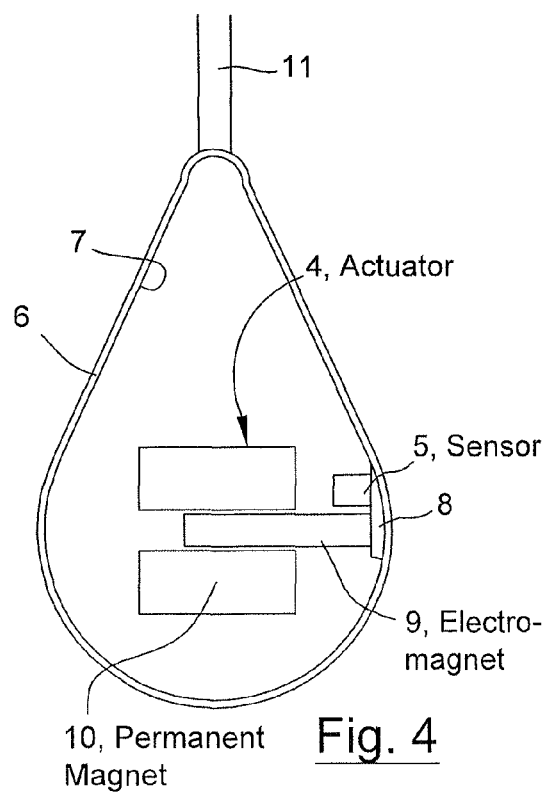

In a first embodiment shown in FIGS. 2-4 the liquidproof housing 6 is constituted by a body, which is preferably drop-shaped so that any contaminations in the liquid will easily glide off, and which is connected to an electric cable 11 in a liquidproof fashion. The body is arranged to be suspended in the reservoir 1 and to hang freely down into the volume delimited by the reservoir 1 by means of the electric cable 11 in such a way that the electric cable 11 is attached in the upper area of the reservoir 1 and the body is suspended in the electric cable 11. In this way the vertical position of the body in relation to the reservoir 1 can be easily adjusted in order to trim/adjust the function of the reservoir 1. Said body present preferably a higher density than the liquid that said reservoir 1 is arranged to house, so that the body shall remain in the same vertical position irrespective of how high the liquid level will rise in the reservoir 1. The difference between the activation signal and the measuring signal will keep increasing the more liquid is present above the body, which for instance may give an indication where the liquid level is located between two vertically separated level sensors.

Figures 5, 6:
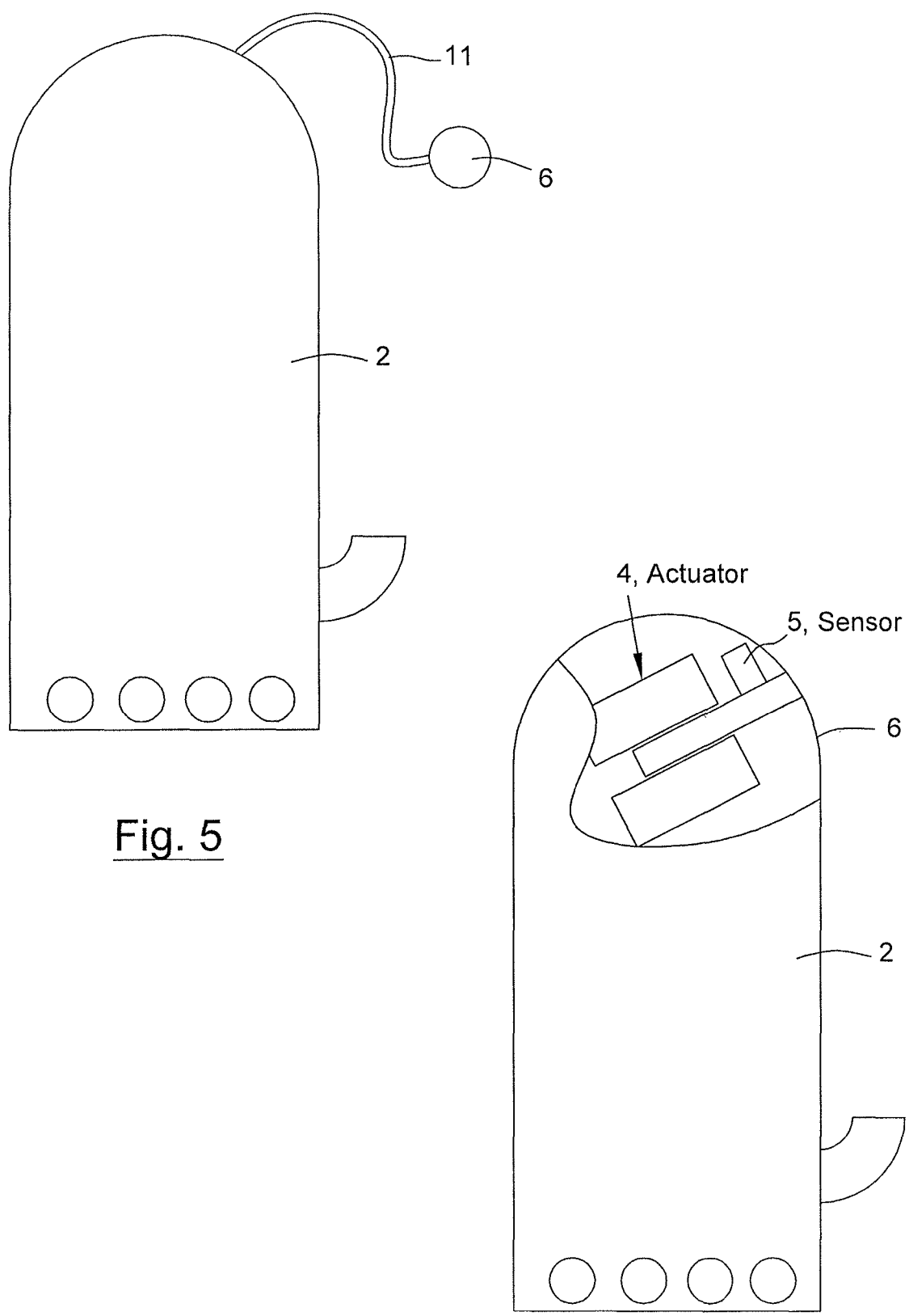
FIG. 5 is a schematic side view of a level sensor according to a second embodiment.
FIG. 6 is a schematic partly cut side view of a level sensor according to a third embodiment.

In a second embodiment shown in FIG. 5 the liquidproof housing 6 is constituted by a body, which as well is connected to an electric cable 11 in a liquidproof fashion. The body is arranged to be connected directly to the pump 2 by means of said electric cable 11, which preferably is formably flexible, e.g. that the position of the body, inter alia vertically, in relation to the pump 2 is adjustable by bending the electric cable which remains in the forced shape. In this way a bilge pump having an adjustable start level for the pump 2 is obtained, which for instance may be stopped when it in a suitable way is detected that the liquid level is so low that the pump 2 partly sucks air, also known as the pump 2 is snoring. It shall be pointed out that the level sensor according to the second embodiment also works with a level sensor working based on other principles than acoustic, such as capacitive principle or calorimetric principle, even thus this is not part of the present invention.

In a third embodiment shown in FIG. 6 the liquidproof housing 6 is constituted by the pump housing of the pump 2, which provides a very robust level sensor. Thus, the at least one actuator 4 and the at least one vibration sensor 5 are operatively connected to the inner side of the pump housing, preferably as close to the top as possible in order to entail an as large difference as possible between start and stop of the pump 2. The more of the pump 2 that is immersed in the liquid the greater the difference between the activation signal and the measuring signal is even thus the liquid level is below the position where the at least one actuator 4 and the at least one vibration sensor 5 are operatively connected to the inner side of the pump housing. However, the alteration rate between the activation signal and the measuring signal increase when the liquid level is on the same level as the position that the at least one actuator 4 and the at least one vibration sensor 5 are operatively connected to the inner side of the pump housing.

In a forth embodiment shown in FIG. 7 the liquidproof housing 6 is constituted by an elongated pipe. Thereto, the at least one actuator 4 and the at least one vibration sensor 5 are arranged inside a cartridge 12, which is axially displaceable in said elongated pipe and which is releasably fastenable in said elongated pipe, at a wanted vertical position in relation to the reservoir 1. The cartridge 12 may for instance be fastenable by turning it around its axial axis and thereby external projections may engage internal projections of the elongated pipe, which external projections of the cartridge runs in an internal longitudinal projection-free channel of the elongated pipe when the cartridge 12 is axially displaced up or down in the elongated pipe. The elongated pipe is preferably fixedly connected to the reservoir 1, even thus the elongated pipe in itself may be axially displaceable in relation to the reservoir 1. When the cartridge 12 is fasten in relation to the elongated pipe the at least one actuator 4 and the at least one vibration sensor 5 will be operatively connected to the liquidproof housing 6, which is constituted by the elongated pipe, direct or indirect via the cartridge 12. It shall be pointed out that several cartridges 12 may be housed axially above each other in the elongated pipe. Preferably the upper end of the elongated pipe ends above the highest liquid level in the reservoir 1, which entails that the upper end of the elongated pipe does not need to be sealed off in order for the elongated pipe to be considered constituting the liquidproof housing 6 of the level sensor. In a preferred realization of this embodiment the elongated pipe may be constituted by a guide rod 13, which is arranged to control and guide said submergible pump 2 upon lowering and hoisting in the reservoir 1.

In a fifth embodiment shown in FIG. 8 the liquidproof housing 6 is constituted by a body that is fixedly arranged somewhere along an electric cable. Said electric cable is a feeding cable 14 that is arranged to be connected to the pump 2 in a liquidproof fashion and that is arranged to provide electric power to the pump 2. This entails in fact that the level sensor is fixedly connected to the pump 2 and upon installation the pump 2 is lowered and the approximate vertical position of the level sensor in relation to the reservoir 1 and the pump 2 is predetermined, which provide a quick installation and starting of the pump 2 in the reservoir 1.

Figure 9:
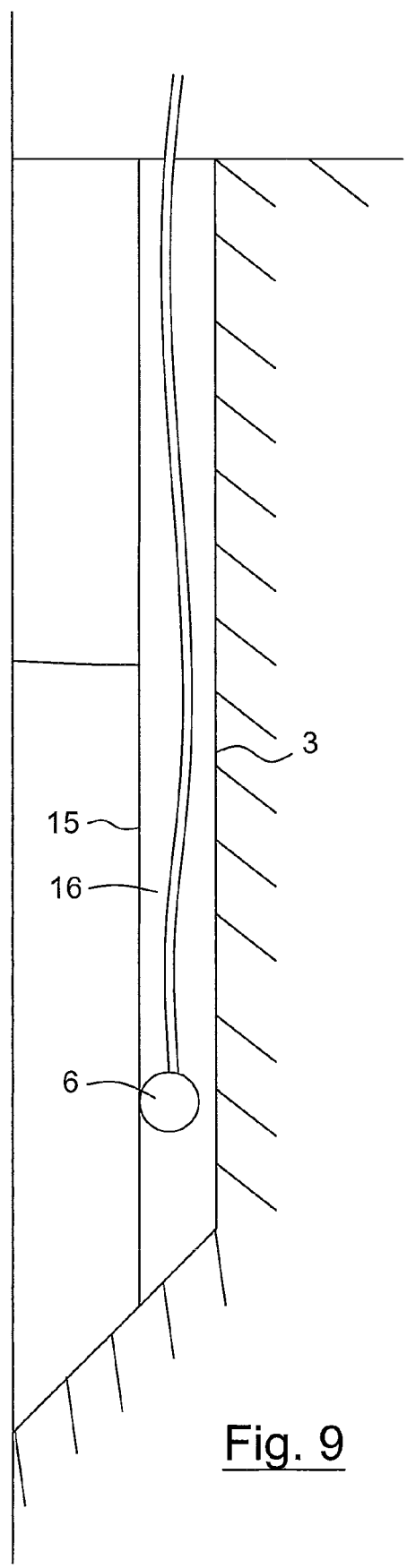
FIG. 9 is a schematic side view of a part of a reservoir and a level sensor according to a sixth embodiment.

In a sixth embodiment shown in FIG. 9 the liquidproof housing 6 is constituted by a body that is connected to an electric cable 11, which connection not necessarily need to be liquidproof. In this embodiment the reservoir 1 present double walls in the form of an inner wall 15 and an outer wall 3, in at least a limited angular segment in relation to a vertical longitudinal centre axis. Between said double walls a space 16 is provided that is accessible from the upper side of the reservoir 1. The body is lowered into the space 16 and is releasably connectable to the outer side of the inner wall 15, for instance the body may be lowered along a guide rail that is fixedly connected to the outer side of the inner wall 15 and be releasably fastened at a requested vertical position.

It shall be pointed out that all embodiments of the level sensor may be in constant operation or in intermittent operation depending on the specific application and the demands made. Thereto they may be driven by a battery that is enclosed in the liquidproof housing or cartridge, thereto wireless communication with the control unit is used. Thereby electric cables may be spared.

FEASIBLE MODIFICATION OF THE INVENTION

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and the equivalents thereof. Thus, the equipment may be modified in all kinds of ways within the scope of the appended claims.

It shall be pointed out that the level sensor may be used to other assignments than starting and stopping a pump, the essential task of the level sensor is to determine the liquid level in a reservoir or a tank. For instance the liquid level in an industrial application may be determined upon filling up of a reservoir with process liquid, alternatively manual emptying of a reservoir may take place when an indication has been received that a predetermined liquid level has been determined in a waste water tank in an airplane or a ship. Yet another example is that a mixer arranged in a reservoir in order to maintain a homogenous liquid mixture shall be stopped of the liquid level in the reservoir is too low.

It shall also be pointed out that all information about/concerning terms such as above, below, etc., shall be interpreted/read having the equipment oriented according to the figures, having the drawings oriented such that the references can be properly read. Thus, such terms only indicates mutual relations in the shown embodiments, which relations may be changed if the inventive equipment is provided with another structure/design.

It shall also be pointed out that even thus it is not explicitly stated that features from a specific embodiment may be combined with features from another embodiment, the combination shall be considered obvious, if the combination is possible.

The invention claimed is:

1. A sensor for determining level of liquid in a reservoir, the reservoir defining a volume within an outer envelope surface, the sensor comprising:
   a liquid-proof housing having an inner side defining an interior space and an outer side, the outer side configured for location radially inside the reservoir outer envelope surface;
   at least one actuator operatively connected to the inner side of the liquid-proof housing, positioned within the interior space and configured to generate vibrations, the at least one actuator comprising an electromagnet having a longitudinal center axis, the electromagnet directly or indirectly fixedly connected to the inner side of the liquid-proof housing and positioned within the interior space, and a permanent magnet movably suspended in the interior space of said liquid-proof housing, the electro magnet and the permanent magnet configured such that an oscillating mutual displacement in parallel with the longitudinal center axis takes place upon activation of the actuator; and
   at least one vibration sensor operatively connected to an inner side of the liquid-proof housing, positioned within the interior space and configured to measure vibrations.

2. The level sensor of claim 1, wherein at least a part of the outer side of the liquid-proof housing is configured to face the volume defined by the reservoir.

3. The level sensor of claim 1, wherein the at least one vibration sensor comprises an accelerometer.

4. The level sensor of claim 1, wherein at least one actuator and at least one vibration sensor are operatively connected to a control unit configured to provide an activation signal to the at least one actuator and to receive a measuring signal from the at least one vibration sensor.

5. A method for detecting liquid level in a reservoir, the method comprising the steps of:
   (a) locating the level sensor of claim 4 with at least the outer side of the liquid-proof housing located within the outer envelope of the reservoir and facing the liquid in the reservoir;
   (b) generating vibrations with the actuator, thereby providing an activation signal;
   (c) detecting, with the vibration sensor, the vibrations generated by the actuator in the form of a measuring signal;
   (d) registering with the control unit a difference between the activation signal and the measuring signal;
   (e) generating a control signal with the control unit based upon whether the difference between the activation signal and the measuring signal is characteristic of the body being in contact with liquid or not in contact with liquid, wherein the difference is greater when the body is in contact with liquid than when not in contact with liquid.

6. The level sensor of claim 1, wherein said liquid-proof housing comprises a body having a liquid-proof connection to an electric cable.

7. The level sensor of claim 6, wherein said body is connected to a pump by said electric cable.

8. The level sensor of claim 7, wherein said electric cable is formably flexible.

9. The level sensor of claim 6, wherein said body is configured for suspension in said reservoir by said electric cable.

10. The level sensor of claim 9, wherein said body has a higher density than the liquid in the reservoir.

11. The level sensor of claim 9, wherein the body is drop-shaped.

12. The level sensor of claim 1, wherein said liquid-proof housing comprises an elongated pipe, and the at least one actuator and the at least one vibration sensor are arranged in a cartridge that is axially displaceable and releasably fastenable within said elongated pipe.

13. The level sensor of claim 12, wherein said elongated pipe comprises an upper end that terminates at a level above the maximum liquid level in the reservoir.

14. The level sensor of claim 1, wherein said liquid-proof housing comprises a pump housing.

15. The level sensor of claim 1, wherein said liquid-proof housing comprises a body fixedly connected along an electrical power cable connected to a pump.

16. A reservoir for housing liquid, comprising at least one level sensor of claim 1.

17. The reservoir of claim 16, further comprising a vertical elongated center axis and, in at least a limited angular segment in relation to said vertical elongated center axis, a pair of double walls in the form of an outer wall and an inner wall having a space delimited by the outer wall and inner wall that is accessible from an upper side of the reservoir, the inner wall having an inner side facing the reservoir and an outer side facing the space between the inner and outer walls, wherein the at least one level sensor is releasably connected to the outer side of the inner wall.

18. The level sensor of claim 1, wherein the vibration sensor is connected to the electro magnet of the actuator.

19. The level sensor of claim 1, wherein the vibration sensor is connected to the inner side of the liquid-proof housing.

20. The level sensor of claim 1, wherein the vibration sensor and the actuator are connected to a rigid plate connected to the inner side of the liquid-proof housing.

\* \* \* \* \*